United States Patent [19]

Munier

[11] 4,085,348
[45] Apr. 18, 1978

[54] ELECTROACOUSTIC DEVICE FOR READING AN OPTICAL IMAGE IN TWO DIMENSIONS

[75] Inventor: Bernard Munier, Paris, France
[73] Assignee: Thomson-CSF, Paris, France
[21] Appl. No.: 750,573
[22] Filed: Dec. 14, 1976

[30] Foreign Application Priority Data

Dec. 19, 1975 France .................. 75 39182

[51] Int. Cl.² ........................................... H01L 41/04
[52] U.S. Cl. ........................................... 310/313
[58] Field of Search .............. 310/313; 333/30 R, 72; 178/7.1, 7.6, DIG. 18; 350/160 R, 269; 250/492 A, 211 R, 211 J

[56] References Cited

U.S. PATENT DOCUMENTS

| B 518,226 | 2/1976 | McGinty | 250/492 A X |
|---|---|---|---|
| 3,895,430 | 7/1975 | Wilson et al. | 250/492 A X |
| 3,944,732 | 3/1976 | Kino | 310/313 X |
| 4,012,586 | 3/1977 | Roos | 310/313 X |
| 4,016,412 | 4/1977 | Stern | 310/313 X |
| 4,025,954 | 5/1977 | Bert | 310/313 X |
| 4,041,536 | 8/1977 | Melcher et al. | 250/211 R X |

*Primary Examiner*—Mark O. Budd
*Attorney, Agent, or Firm*—Roland Plottel

[57] ABSTRACT

A device for the electrical line-by-line analysis of an optical image in two dimensions. It comprises a piezoelectric medium associated with a semiconductive medium onto which the image is projected, and at least three transducers emitting surface elastic waves on the piezoelectric medium. Two of three transducers emit pulses in two separate directions, the convergence point of which constitutes a reading point of the image. This point moves as a function of time along a straight line which constitutes an analysis line of said image. The third transducer emits a long wave, the wave vector of which is such that the wave vector resulting from the interaction of the three waves is zero.

10 Claims, 8 Drawing Figures

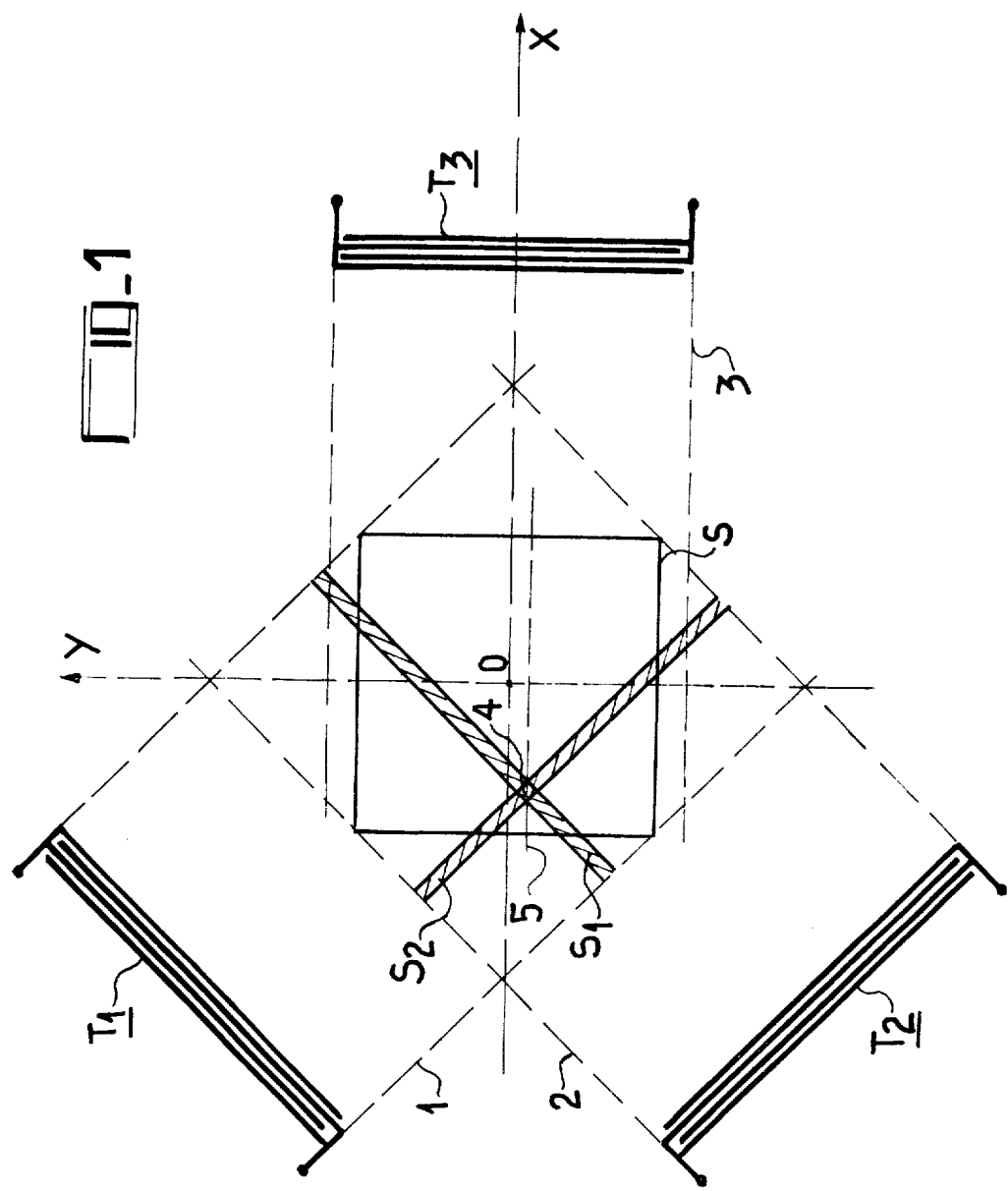

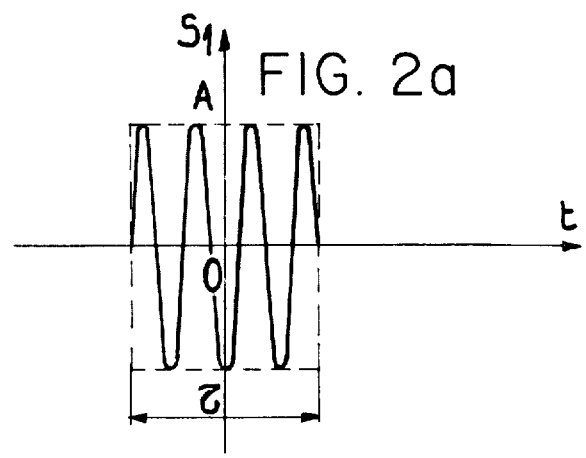
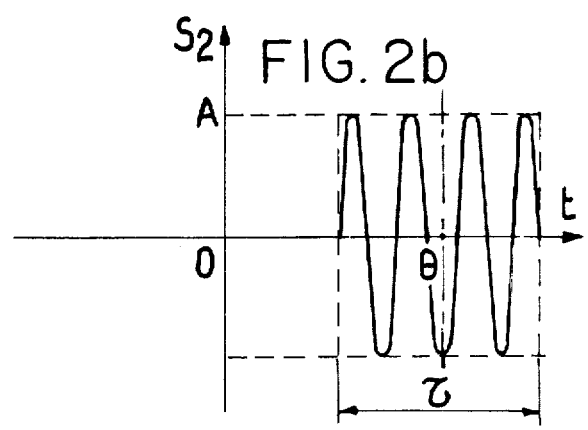
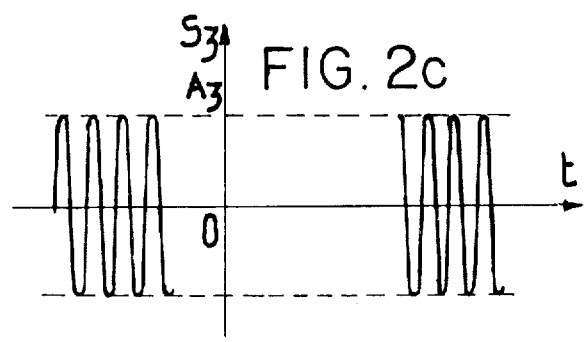

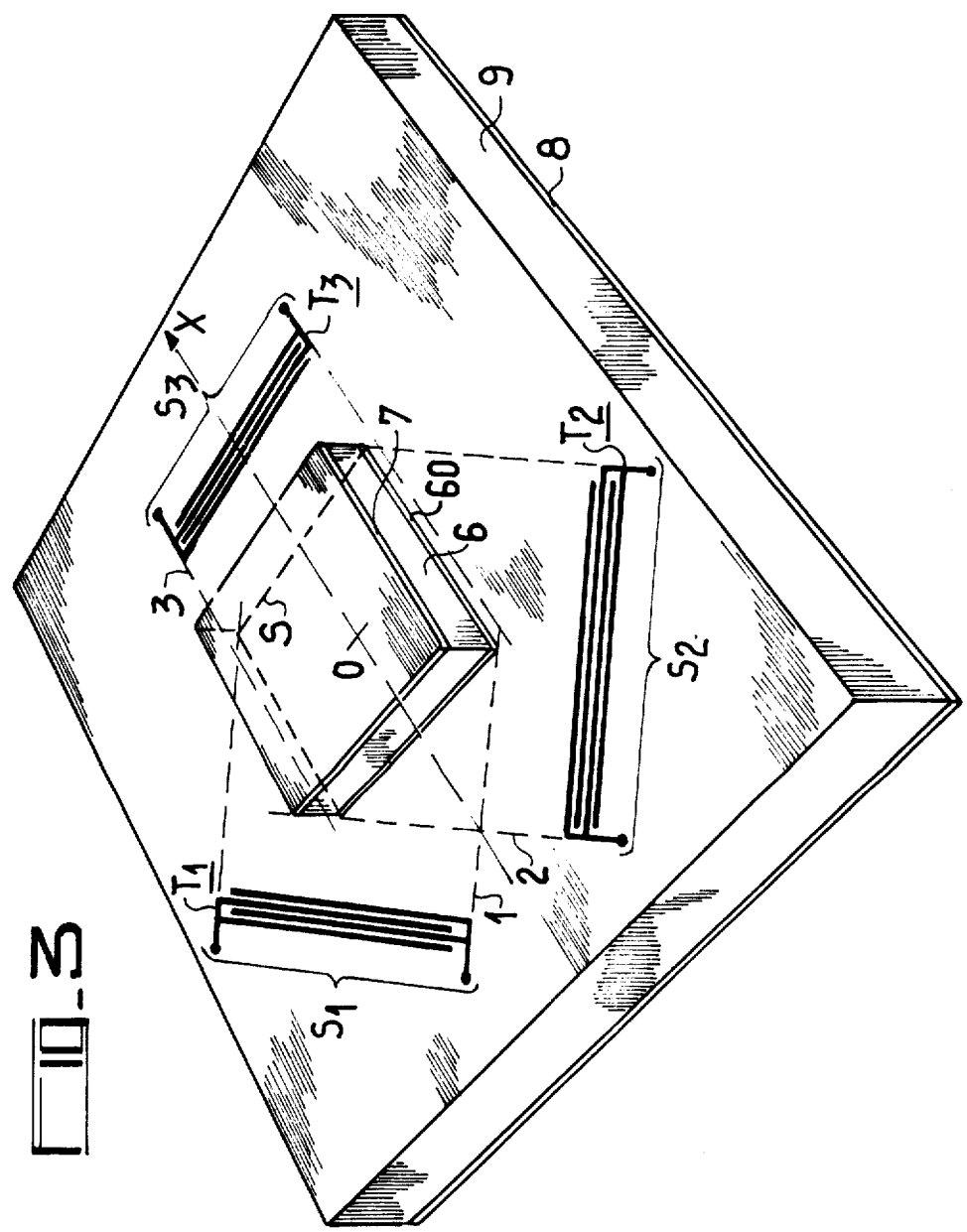

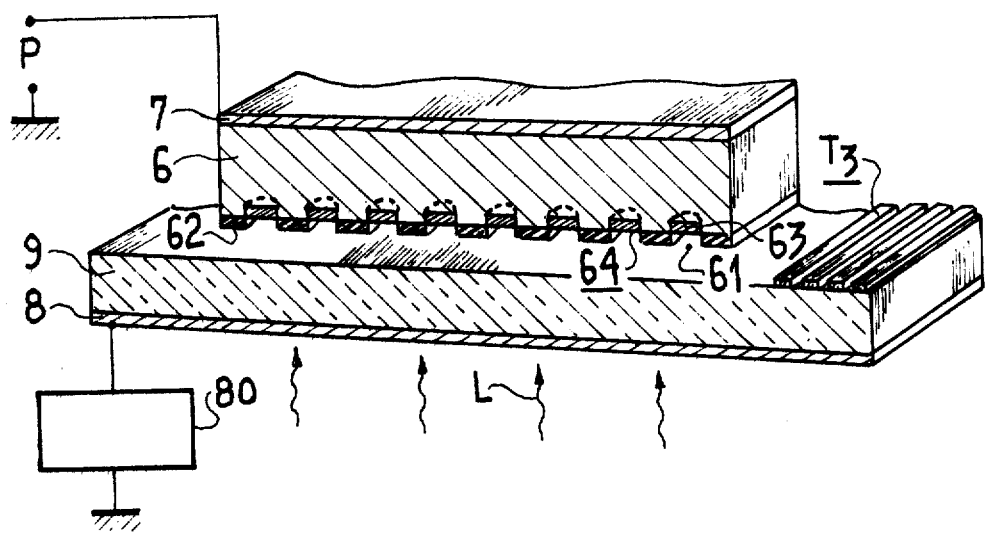
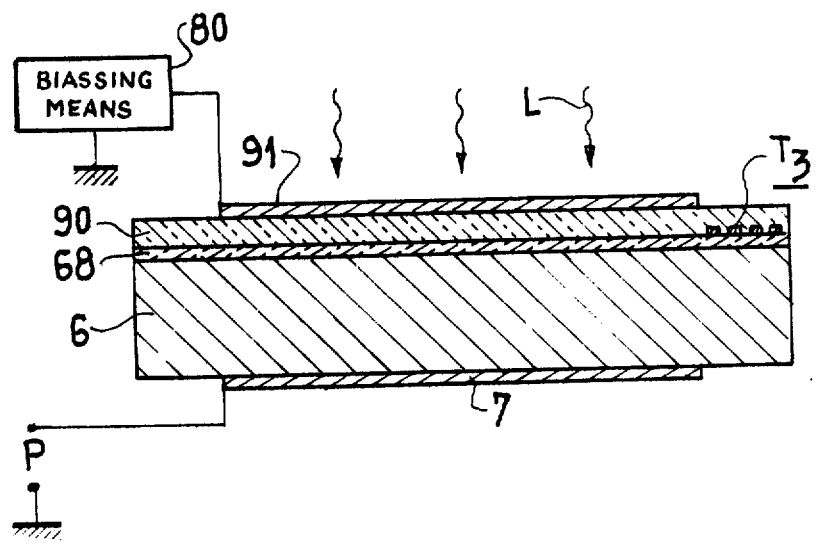

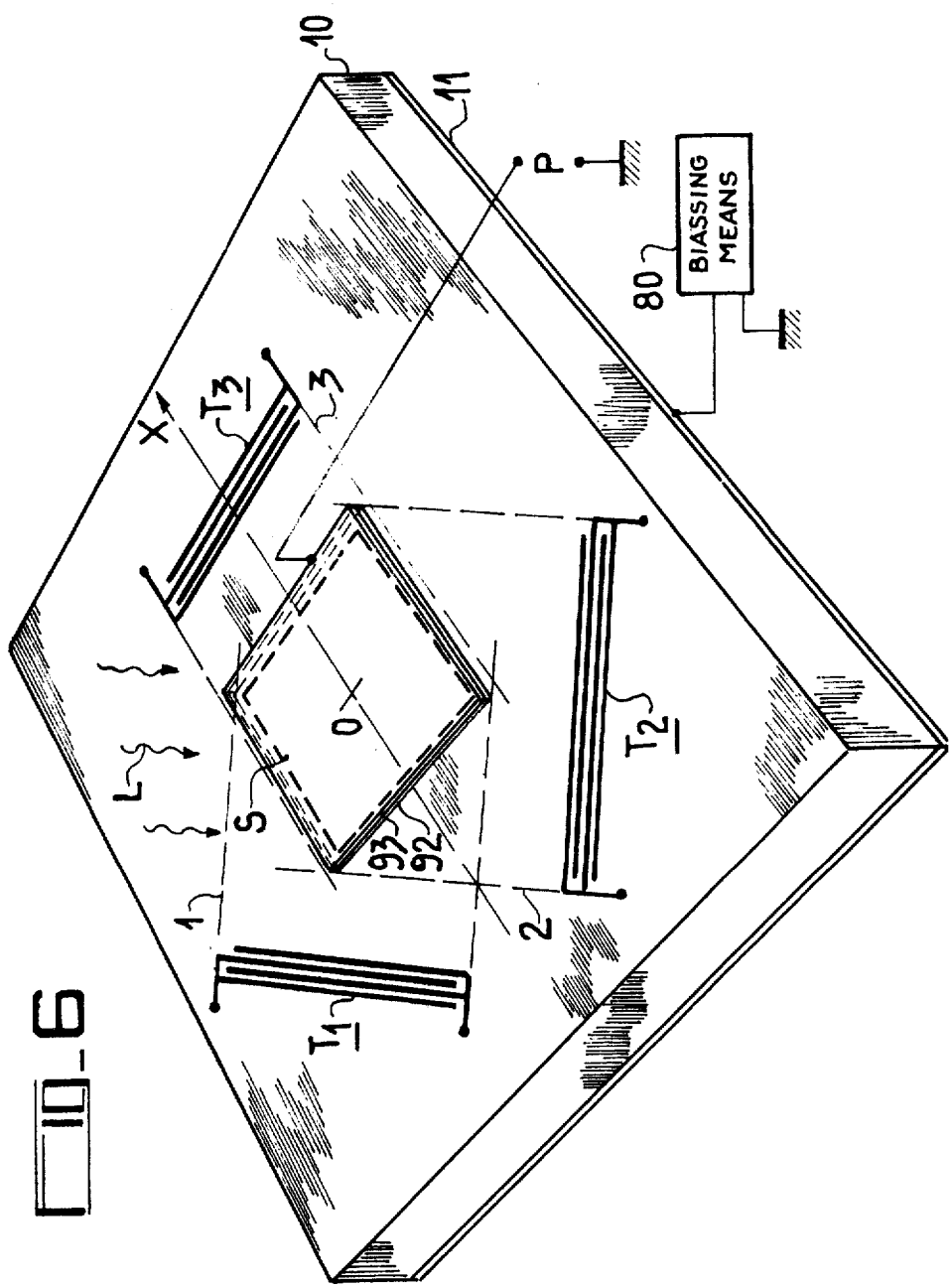

ELECTROACOUSTIC DEVICE FOR READING AN OPTICAL IMAGE IN TWO DIMENSIONS

This invention relates to a device for electrically reading an optical image in two dimensions by means of acoustic surface waves.

The reading of images by means of acoustic, or elastic, waves is generally obtained by way of non-linear interactions between electrical fields in a semiconductor, these fields being those which are associated with the deformations of a piezoelectric crystal on which elastic surface waves are propagated.

One type of suitable structure is formed by a piezoelectric crystal and a semiconductor crystal placed opposite one another with a thin layer of air in between. Another possible structure is formed by a semiconductor crystal onto which is deposited a thin piezoelectric layer, i.e. a piezoelectric layer of which the thickness is of the order of a fraction of the elastic wave-length. Finally, another possibility is to use a single material which is both piezoelectric and semiconductive.

The signal representing the interaction may be for example the electrical current which arises out of this interaction and which flows through the semiconductor.

The image to be read is projected onto the semiconductor where, by spatially modulating the conductivity of the semiconductor, it modulates the intensity of the signal arising out of the non-linear interaction.

The present invention relates to the use of structures of the type in question for reading an optical image in two dimensions.

According to the invention, there is provided an electroacoustic device for reading an optical image in two dimensions, comprising a first medium which is a piezoelectric medium and a second medium which is a semiconductive and photosensitive medium, coupled with said first medium and where said image is projected along an interaction surface, producing a spatial modulation of conductivity of said first medium, said piezoelectric medium carrying at least three electromechanical transducers, the first of said transducers generating a long elastic wave at the surface of said first medium, the duration of that wave being equal to at least twice the scanning time of the surface by an elastic wave, the second and the third of said transducers generating pulse-form elastic waves in two separate directions at the surface of said first medium, the intersection of said two directions defining an elementary interaction zone, said pulses being emitted with a period at least equal to the scanning time of one line of said interaction surface by said elementary zone, and with variable relative delays for ensuring the line-by-line scanning of said interaction surface by said elementary zone, the wave vectors of the three elastic waves generated by said transducers being such that the electrical fields associated with said three waves interact non-linearly in said second medium to give a resultant signal the wave vector of which is substantially zero, said device further comprising means for extracting said resultant signal.

For a better understanding of the invention and to show how it can be carried into effect, reference will be made to the following description and the accompanying drawings, wherein:

FIG. 1 is a diagram illustrating the operation of the device according to the invention.

FIGS. 2a, 2b and 2c show forms of signals which may be used in the device according to the invention.

FIG. 3 shows a first embodiment of the device according to the invention.

FIG. 4 is a section through a variant embodiment of the preceding Figure with improved sensitivity.

FIG. 5 shows, in section, a second embodiment of the device according to the invention.

FIG. 6 shows a third embodiment of the device according to the invention.

In these various Figures, the same reference numerals denote the same elements.

In order to describe the method of scanning by the nonlinear interaction, of the surface where the image is projected, the diagram of FIG. 1 shows only three electromechanical transducers $T_1$, $T_2$ and $T_3$, the surface S onto which the image to be analysed is projected, known as the interaction surface, for example square, and rectangular reference axes XOY centred on the surface S and parallel to the sides of the square. The transducers $T_1$ and $T_2$ are arranged symmetrically relative to the axis OX and generate elastic waves in two directions 1 and 2, respectively, which form the same angle, for example 45°, with the axis OX. The transducer $T_3$ is so arranged as to emit elastic waves in the direction OX.

In operation, the transducers $T_1$ and $T_2$ generate pulse waves in response to the excitation of an electrical signal of which one example is shown in FIGS. 2a and 2b. FIG. 2a shows a signal $S_1$, applied to the transducer $T_1$, of which the carrier has a pulsation $\omega$ and an amplitude A in the form of a rectangular pulse of brief duration $\tau$. FIG. 2b shows a signal $S_2$, applied to the transducer $T_2$, with the same carrier, in the form of a rectangular pulse preferably of the same duration $\tau$, but delayed relative to $S_1$ by a time $\theta$.

In FIG. 1, the position of the elastic pulses at a given instant is represented by bands which, for the sake of simplicity, are denoted $S_1$ and $S_2$ and of which the intersection 4 constitutes an elementary interaction zone. Each elastic pulse is characterised by a pulsation equal to $\omega$ and a wave vector $\vec{k}$ of which the amplitude is equal to $k = \omega/v$ if $v$ is the propagation velocity of the elastic waves.

As already known, the non-linear interaction of the waves $S_1$ and $S_2$ produces a signal of which the pulsation is equal to $2\omega$ and of which the wave vector $\vec{k}_{1-2}$ has an amplitude equal to $k\cdot\sqrt{2}$ and a direction parallel to the bisector of the angle of the two transducers, i.e. in this case parallel to $\vec{OX}$. When the two pulses $S_1$ and $S_2$ are propagating, their intersection, i.e. the elementary zone 4, thus describes a straight line 5 parallel to OX; the distance of the line 3 from OX depends on the delay $\theta$ which $S_2$ was emitted relative to $S_1$. It is therefore possible to scan a surface such as S along a field of lines parallel to the straight line 5 by varying the relative delay $\theta$ between the waves $S_1$ and $S_2$.

The transducer $T_3$ generates an elastic wave of long duration along a path denoted by the reference 3 in the Figure and parallel to OX, in response to the excitation of an electrical signal $S_3$ of which one example is given in FIG. 2c. This signal is a sinusoidal wave with a pulsation $\omega_3 = \omega\cdot\sqrt{2}$ and an amplitude $A_3$ of which the value is theoretically arbitrary relative to the amplitude (A) of the signals $S_1$ and $S_2$. In practice, however, it may be preferable for $A_3$ to be lower than A.

The elastic wave emitted by $T_3$, which for reasons of convenience is denoted $S_3$, thus has a wave vector $(\vec{k}_3)$ which is directed along $-\overrightarrow{OX}$ and of which the amplitude is equal to:

$$k_3 = \frac{\omega_3}{v} = \frac{\omega\sqrt{2}}{v} = k \cdot \sqrt{2}.$$

The non-linear interaction of the wave $S_3$ with the two pulses $S_1$ and $S_2$ gives a wave P with a total pulsation $(2w + \omega\cdot\sqrt{2})$ and a wave vector $\overrightarrow{K} = \overrightarrow{k}_{12} + \overrightarrow{k}_3$. Since these two vectors have the same amplitude and opposite directions, the resulting wave vector $(\overrightarrow{K})$ is zero.

The advantage of this is that the surface S constitutes a phase plane, so that the interaction signal P may be collected at any point without any constraints from spatial periodicity, for example by means of continuous electrodes.

FIG. 3 shows a first embodiment of the device according to the invention.

The device comprises a piezoelectric substrate 9 in the form of a thin plate onto which the three electromechanical transducers $T_1$, $T_2$ and $T_3$ are deposited. The electromechanical transducers are each conventionally formed for example by two electrodes in the form of interdigital combs. At the surface of the substrate 9, they generate elastic waves in a direction normal to the fingers of the combs, along paths respectively denoted 1, 2 and 3 for the transducers $T_1$, $T_2$ and $T_3$. The interaction surface S is situated at the intersection of these paths. On this interaction surface S there are successively deposited a dielectric layer 60, a semiconductive and photosensitive material 6 in the form of a thin plate and an electrode 7 covering the upper surface of the semiconductor 6. The layer 60 is divided for example into a layer of air, intended to prevent damping of the elastic waves being propagated at the surface of the substrate 9, and a thin layer of oxide enabling surface effects to be eliminated. The surface effects are due to the surface of the semiconductor which may show in particular random dislocations in the crystalline structure or deposits of impurities, which constitute traps for the electrical charges and which interfere with operation of the structure. The lower surface of the piezoelectric substrate 9 is also covered by an electrode denoted by the reference 8.

In operation, the image to be analysed is projected onto the lower surface of the semiconductor 6 which is opposite the surface 9. This can be done either from the side of the substrate 9, which in that case must be transparent to the radiation in question together with the electrode 8, or from the side of the semiconductor 6 which, in that case, must be of limited thickness by comparison with the diffusion length of the electrical charges created by the illumination. It is known that the image thus projected spatially modulates the conductivity of the semiconductor in dependence upon the information which it carries and, hence, the effectiveness of the non-linear interaction. The electrical signal P extracted between the electrodes 7 and 8 at a given instant will thus have an intensity governed by the local illumination on the elementary interaction zone defined above. Scanning in accordance with what has been described in reference to FIG. 1 produces an electrical signal (P) which sequentially represents the line-by-line analysis of the surface S.

It should be noted that the structure may additionally comprise means for biassing the structure, of which the role is to optimise the sensitivity of the device to the incident light and of which one embodiment is described hereinafter.

It was assumed for the purposes of the foregoing description that the piezoelectric material was isotropic. However, this is not absolutely essential. Similarly, the inclination at 45° relative to the axis OX of the wave vectors ($\overrightarrow{k}_1$ and $\overrightarrow{k}_2$) of the waves $S_1$ and $S_2$ is not imperative, because it is sufficient for the wave vector $\overrightarrow{K}$ of the wave arising out of the interaction to be zero, which is written as follows:

$$\overrightarrow{K} = \overrightarrow{k}_1 + \overrightarrow{k}_2 + \overrightarrow{k}_3 = 0.$$

Finally, no provision was made in the foregoing for processing of the signals. This is of course possible. It may consist for example in a spatial modulation of the projected image by a grid of which the bars are normal to the analysis lines of the image, said modulation introducing a supplementary spatial frequency $k_4$. In this case, it is the spatial frequency arising out of the sum of all the terms ($k_1$ to $k_4$) which has to be zero, for the resulting signal P to be able to be extracted by a continuous electrode.

FIG. 4 shows a variant embodiment, seen in section along the axis OX, of the structure illustrated in FIG. 3 in which the sensitivity is improved by the addition of diodes to the semiconductor.

FIG. 4 shows:

the piezoelectric plate 9, of which the lower surface carries the electrode 8 and the upper surface the transducer 23;

the semiconductive and photoconductive plate 6 of which the upper surface carries the electrode 7 for extracting the interaction signal P and of which the lower surface is separated from the substrate 9 by an air gap 61.

The lower surface of the semiconductor 6 is coated with an insulative layer 62 (made for example by oxidation) formed with openings for the formation by diffusion of zones 63 with a conductivity type opposite to that of the material 6. A network of PN diodes wholy denoted by the reference 64 is thus formed.

The image to be analyzed is projected onto the lower surface of the semiconductor 6 from the side of the piezoelectric substrate 9 (arrows L).

As described in Applicants' French Patent Application No. 75-27 926, the presence of the junctions 6 normally results in the formation of depletion zones around the junctions, i.e. zones depleted of majority charge carriers. The result is that the effects of the incident light L are more significant, the formation of electron-hole pairs by the photons thus taking place in a medium depleted of charge carriers. In addition, since the increase in sensitivity is local (i.e. limited to the site of each junction), the elementary image zones are thus materially delimited and insulated, which leads to an improvement in the restoration of the image.

As shown in FIG. 4, the structure may additionally comprise means for biassing the structure which, in this case, are formed for example by a potential source 80 connected between the electrode 8 and earth, the signal P being collected between the electrode 7 and earth.

FIG. 4 shows a network of PN-diodes, although it is of course possible to replace them by other types of junctions, in particular by Schottky diodes. Diodes such as these may be formed for example by the deposition of a metallic electrode in each of the openings formed in the insulating layer 62. The structure thus obtained operates in a manner similar to the preceding structure.

Finally, since the signal arising out of the non-linear interaction has a wave number K of zero, there are no constraints from spatial periodicity for the distribution of the diodes, which may therefore be arbitrary, as for the sensor of the interaction signal P.

FIG. 5 shows a second embodiment of the structure according to the invention in which the piezoelectric medium is formed by a thin layer deposited onto the semiconductor medium.

This Figure shows in section on the axis OX of FIG. 1:

The semiconductive and photosensitive material 6 in the form of a plate which, on its lower surface, carries a flat electrode 7 and, on its upper surface, a thin insulating layer 68. The presence of this layer 68 is not necessary, but its function is the same as before, namely to eliminate the surface effects of the semiconductor;

The piezoelectric material which is in the form of a thin layer 90, deposited onto the insulating layer 68. Its thickness is at most of the order of the length of an elastic wave and, typically, of the order of a fraction, for example one tenth, of the wave-length. On its upper surface, the piezoelectric layer 90 carries a flat electrode 91 which may either be kept at the reference potential or may be connected to the biassing voltage source 80, as shown in FIG. 5 and in the same way as for FIG. 4;

The electromechanical transducer $T_3$, deposited like the other transducers (not shown in the Figure) at the interface of the layers 68 and 90 and generating an elastic surface wave of which the propagation is made possible by the minimal thickness of the piezoelectric layer 90. It should be noted that the transducers $T_1$, $T_2$ and $T_3$ may also be deposited on the piezoelectric layer 90.

So far as the operation of a structure such as this is concerned, the image (L) is projected onto that surface of the semiconductor 6 which is opposite the piezoelectric material 90, through the latter, and the mechanism for scanning the interaction surface is the same as before, the signal P arising out of the interaction being extracted between the electrode 7 and earth. Similarly, the method by which the described structure is biassed merely represents an example of embodiment.

Finally, as in the preceding embodiment where the semiconductive and piezoelectric media are separated by a layer of air, it is possible to improve the sensitivity of the structure by an assembly of PN of Schottky diodes, formed in a manner similar to that illustrated in FIG. 4, on that surface of the semiconductor 6 which is opposite the piezoelectric layer 90.

One technological embodiment of the structure according to the invention is described by way of example in the following.

So far as the choice of material is concerned, the piezoelectric material may be formed by lithium niobate ($LiNbO_3$), zinc oxide (ZnO), gallium or aluminium nitride, etc. The insulating layers thus consist of silicon oxide $SiO_2$, silicon nitride $Si_3N_4$ or alumina $Al_2O_3$. The semiconductor is selected in particular according to the wavelength range to which it is sensitive, and it is possible to use for example silicon, gallium arsenide or numerous binary compounds of Groups III and V of the Periodic System or of Groups II and VI or IV and VI of that System.

In cases where the structure is formed by two separate materials (semiconductor and piezoelectric separated by an air gap), the semiconductor material 6 may be formed from a P-type semiconductor substrate on which the electrode is formed by an N+ diffusion. A thin N-type layer (thickness of the order of 10 $\mu$m) is then deposited by epitaxial growth. On a structure such as this, P-N or Schottky junctions (64 in FIG. 4) are formed by any technique known in the field of semiconductors.

In the case of FIG. 5, where the structure is formed by a thin piezoelectric layer (90) deposited onto a semiconductive plate (6), the plate 6 is made for example of silicon, the insulating layer 68 of silicon oxide $SiO_2$, the transducers $T_1$, $T_2$ and $T_3$ are deposited by evaporation on the layer 68 and the piezoelectric layer 90 by cathode sputtering.

FIG. 6 shows a third embodiment of the structure according to the invention which uses a material simultaneously having the two properties of piezoelectricity and semiconductivity photosensitivity.

This structure is formed by a piezoelectric, semiconductive and photosensitive substrate 10, such as gallium arsenide or cadmium sulphide, of which the lower surface is covered by an electrode 11 and its upper surface by transducers $T_1$, $T_2$ and $T_3$, formed and arranged in the same way as before. At the interaction surface S, the substrate 10 is covered with a thin insulating layer 92 of which the thickness is of the order of, or less than, the length of an elastic wave and which is itself covered by an electrode 93. Means for biassing the substrate may be provided, being formed for example, as shown in the Figure, by a voltage source 80 connected between the electrode 11 and earth.

The structure operates in a manner similar to the structures described above, the image L to be analysed being projected onto the surface S through the layers 92 and 93 and the interaction signal P being extracted between the electrode 93 and earth.

Finally, as in the previous embodiments, the sensitivity of the device may be improved by means of PN or Schottky junctions arranged in any way on the surface S of the substrate.

Of course, the invention is not limited to the embodiment described and shown which was given solely by way of example.

What is claimed, is:

1. An electro-acoustic device for reading an optical image in two dimensions, comprising a first medium which is a piezoelectric medium and a second medium which is a semiconductive and photosensitive medium, coupled with said first medium and where said image is projected along an interaction surface, producing a spatial modulation of conductivity of said first medium, said piezoelectric medium carrying at least three electromechanical transducers, the first of said transducers generating a long elastic wave at the surface of said first medium, the duration of that wave being equal to at least twice the scanning time of the surface by an elastic wave, the second and the third of said transducers generating pulse-form elastic waves in two separate directions at the surface of said first medium, the intersection of said two directions defining an elementary interaction zone, said pulses being emitted with a period at least equal to the scanning time of one line of said interaction surface by said elementary zone, and with variable relative delays for ensuring the line-by-line scanning of said interaction surface by said elementary zone, the wave vectors of the three elastic waves generated by said transducers being such that the electrical fields associated with said three waves interact non-linearly in said second medium to give a resultant signal the wave vector of which is substantially zero, said device further comprising means for extracting said resultant signal.

2. A device as claimed in claim 1, wherein said piezoelectric medium is isotropic.

3. A device as claimed in claim 2, wherein said two directions are normal with respect to one another, the wave generated by said first transducer being directed along the bisector of the angle formed by said two directions in the opposite sense, the frequency of the two said pulses being the same.

4. A device as claimed in claim 1, wherein said piezoelectric medium is formed by a first plate and said semiconductor medium is formed by a second plate, said device further comprising means for introducing a layer of air between the two said plates, said interaction surface being carried by that surface of the semiconductor which is opposite said first plate, the elastic waves being propagated along that of the surfaces of said first plate which is opposite said interaction surface.

5. A device as claimed in claim 1, wherein said semiconductor medium is formed by a plate onto which is deposited a layer of piezoelectric material forming said first medium, the thickness of which is at most of the order of the elastic wave-length.

6. A device as claimed in claim 5, wherein said thickness is of the order of the tenth of the elastic wave-length.

7. A device as claimed in claim 1, wherein said means for extracting the resultant signal comprise two electrodes respectively covering the extreme surfaces of said piezoelectric and semiconductive media.

8. A device as claimed in claim 1, wherein said first and second media are situated on the same substrate, said extraction means comprising two electrodes, the first electrode covering a thin dielectric layer placed on said interaction surface and the second electrode covering that surface of said substrate which is opposite said interaction surface.

9. A device as claimed in claim 1, further comprising means for biassing said media.

10. A device as claimed in claim 1, wherein a discrete assembly of PN or Schottky diodes is provided on said interaction surface.

* * * * *